No. 627,009. Patented June 13, 1899.
L. PAGET.
STORAGE BATTERY AND METHOD OF PREPARING ELECTRODES THEREFOR.
(Application filed May 1, 1899.)
(No Model.)
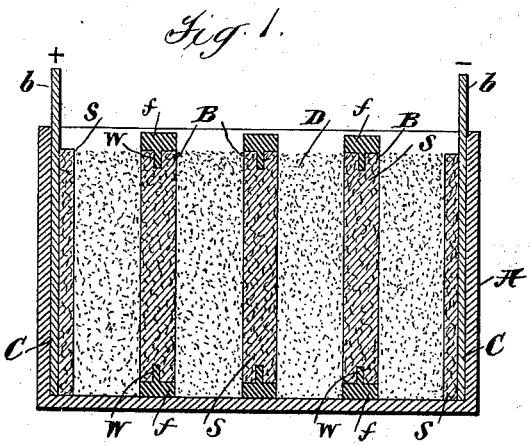
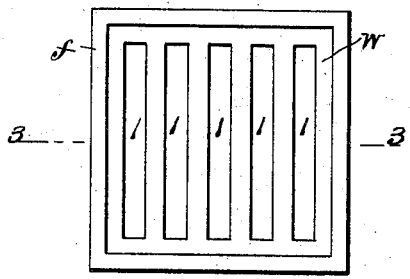
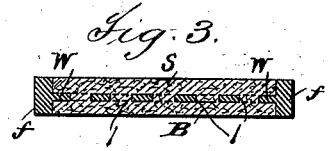
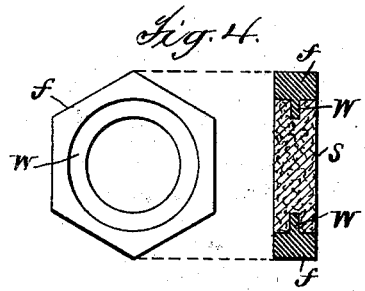
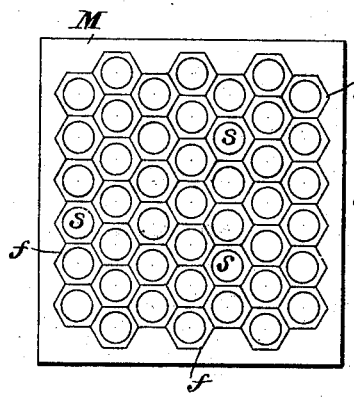
Attest:
Geo. H. Botts
J. A. Graves
Inventor:
Leonard Paget
By Philipp, Phelps & Sawyer
Attys

United States Patent Office.

LEONARD PAGET, OF NEW YORK, N. Y., ASSIGNOR TO THE KNICKERBOCKER TRUST COMPANY, TRUSTEE, OF SAME PLACE.

STORAGE BATTERY AND METHOD OF PREPARING ELECTRODES THEREFOR.

SPECIFICATION forming part of Letters Patent No. 627,009, dated June 13, 1899.

Application filed May 1, 1899. Serial No. 715,124. (No model.)

*To all whom it may concern:*

Be it known that I, LEONARD PAGET, a citizen of the United States, residing at New York, borough of Manhattan, county of New York, and State of New York, have invented certain new and useful Improvements in Storage Batteries and Methods of Preparing Electrodes Therefor, fully described and represented in the following specification and the accompanying drawings, forming a part of the same.

This invention relates to storage batteries, and especially to storage batteries formed of two or more cells; and the invention includes certain improvements in storage batteries of this class and in plates or electrodes for such storage batteries and certain improved methods of making such electrodes.

The especial object of my invention is to provide a battery the plates of which may be quickly and uniformly charged and discharged, which shall be of light weight in relation to its electrical output, in which the imperfect contact and sulfating between the active material and metallic supports or conductors shall be avoided, and which shall be simple and cheap in construction and operation.

A further object also is the provision of suitable means for holding the active material of a storage battery and permitting the full exercise of its expansive and contractive forces under the regimen of charge and discharge.

I have illustrated in the accompanying drawings a battery and plates or electrodes embodying the structural features of my invention in preferred forms, and these constructions will now be described and the features forming the invention then specifically pointed out in the claims.

In the drawings, Figure 1 is a longitudinal section of a complete battery of four cells. Fig. 2 is a face view or elevation of a frame of simple form which may be used for supporting the active material. Fig. 3 is a cross-section on the line 3 of Fig. 2, showing the complete plate. Fig. 4 represents an elemental portion of the form of plate which is preferably used, especially in large cells. Fig. 5 is a face view or elevation of a plate formed of elemental portions such as shown in Fig. 4.

Referring now especially to Figs. 1 to 3, A is the cell-casing or containing vessel, which may be of any suitable form and material so as to be non-conducting and is divided into four cells by the intermediate electrodes B. The end electrodes may be of any convenient form or material, but are shown as formed of plates C, which may be lead plates faced with active material or material adapted to become active, $s$, which may be of any suitable character, but is preferably lead oxid, such as is usually employed in storage-battery electrodes, and provided with the usual connecting-lugs $b$, which in my battery are required for terminal connection only. Each of the intermediate electrodes B is formed of a frame of non-conducting material, forming a support for the active material $s$, the construction of these intermediate electrodes (shown in Figs. 1 to 3) being as follows:

The frame $f$, forming the support, may be of any suitable non-conducting material which will not be injuriously acted upon by the current or electrolyte, such as hard rubber or celluloid, but which is preferably of an elastic non-conducting material, such as well-vulcanized soft rubber, to permit the expansion of the active material and hold it properly during contraction. This frame preferably has a web $w$, which is provided with openings 1 through it, which may be of any suitable form, but are shown as slots, and this frame is filled on both sides flush with the frame portion $f$ with suitable material adapted to become active material and of such a character as to permit the active constituents of a suitable electrolyte to penetrate the material throughout its entire mass and secure the electrical action required for the conversion of the entire body of material into the active material of a bipolar plate. Different materials may be used—such as "spongy lead," by which I mean finely-granulated or electrolytically-formed or chemically-precipitated metallic lead, or various lead oxids or insoluble sulfates or other insoluble salts of lead or of other metals that are readily oxidizable and reducible—but preferably I use lead oxid, and I have found that litharge is a cheap and very efficient material for my purpose. All these and similar materials meet the requirements for use in my intermediate electrodes in that they are adapted to be rendered active by a forming or charging current and are finely-divided materials, such finely-divided materials being necessary for my purpose, so that the active constituents of a suitable electrolyte may permeate the entire mass, and the conduction of the current is from particle to particle of the material, and continuous unbroken conductors of the electrical current through the plate are avoided. These materials may be applied to the frame in any suitable manner. A convenient and suitable method is to form a paste of the material with dilute sulfuric acid or other suitable liquid and fill the frame with it. In filling the frame with this material care should be taken to establish a good conducting connection of the material on both sides of the plate through the openings 1 in the web $w$, and this filling is preferably a homogeneous integral mass of material. With the intermediate plates thus formed and set up in the battery, as shown in Fig. 1, the battery will be set in action by filling each compartment or space between the plates with an electrolyte to a suitable level, as shown, the electrolyte preferably being contained or held by an absorbent material D. Any suitable electrolyte may be used—for instance, a sulfuric-acid solution—and the absorbent material may be of any suitable character, tripoli or pumice being suitable for this purpose. The battery is then connected in circuit with a source of electric current, preferably of about two and a half volts electromotive force for each cell, although this may be varied, until the plates are formed and charged. It will be understood that the battery is connected with the source of electric current by connecting the positive and negative and electrodes of the battery to the corresponding conductors of the charging-current and that the end electrodes and intermediate electrodes are connected in electrical series through the electrolyte and the lead oxid or other finely-divided material constituting the intermediate electrodes, so that this material forms the sole conducting connection between the opposite sides of each of the intermediate electrodes and between the successive cells. One side of each of the intermediate plates B is thus charged positively and the opposite side negatively, lead oxid, if this be used in filling the frame, being converted into peroxid of lead on one side and reduced on the opposite side, so as to form a bipolar electrode. From my observation this forming and charging action appears to commence within the mass of material and proceeds outward in opposite directions. The extent of peroxidation and reduction depends upon the duration of the charging-current. With the proper duration of the charging-current the opposite sides of the material will be peroxidized and reduced and charged throughout, which is desirable, as otherwise local action may be set up in discharging the battery and the efficiency of the battery reduced.

The action of the forming or charging current on the end electrodes when constructed as shown is of course the conversion of the material $s$ if lead oxid be used into lead peroxid on one of these end electrodes and electrically-reduced lead on the other.

It will be understood that the material forming the intermediate plates B may be peroxidized and reduced in the battery in which they are to be used during discharge or that the plates may be prepared in any suitable manner independently of such battery. It will be understood also that the frame described is used only as a support for the mass of material $s$ and that the invention, considered broadly, includes constructions in which such support is not used, the plates being supported in the battery at their edges by any suitable means.

It will be seen that by the use of my improved intermediate bipolar electrodes perfect conductivity of the active material is secured, as the conduction of the current between the cells is by the active material itself, which avoids the imperfect contact which always exists between active material and a separate conductor, and this feature, with the non-conducting support, avoids all possibility of "sulfation" between the active material and a conductor or support in the intermediate electrodes of a battery.

I have found that the proper relative amounts of active material required for the positive and negative charge are secured in an integral mass of lead oxid or other suitable material by the action of the current. A light battery of large capacity is secured by the absence of metallic plates or grids to support the active material and of the lugs or conductor-pieces usually employed for connecting cells of a battery, and the resistance of the cell is decreased and waste of energy avoided by the perfect conducting connection from cell to cell through the active material.

Large plates may be constructed, as already described, and shown in Figs. 2 and 3; but to afford greater freedom for expansion of the active material I preferably construct plates of any considerable size, as shown in Figs. 4 and 5. Fig. 4 shows an elemental portion of such plates, which elemental portion consists of a hexagonal frame $f$, of non-conducting elastic material, such as well-vulcanized rubber, which is preferably formed with an interior web $w$. This frame is filled with a mass of suitable material, as in the case of the frame shown in Figs. 1 to 3. The desired number of these hexagonal frames are then piled up together, as shown in Fig. 5, and a plate formed of the required size, and these frames are then secured and held together by suitable means, preferably by casting around them a border M of some suitable non-conducting cement, such as an asphalt compound. These plates are then set up to form a battery in the same manner as the plates B, as shown in Fig. 1.

What I claim is—

1. A storage-battery electrode in which finely-divided active material forms the sole conducting connection between the opposite sides of the electrode, the opposite sides of said active material consisting of oxidized and oxidizable material, substantially as described.

2. A storage-battery electrode having an integral body of finely-divided active material constituting the sole conducting connection between the opposite sides of the electrode, the opposite sides of said active material consisting of oxidized and oxidizable material, substantially as described.

3. A storage-battery electrode having a support of non-conducting material and finely-divided active material on said support constituting the sole conducting connection between the opposite sides of the electrode, the opposite sides of said active material consisting of oxidized and oxidizable material, substantially as described.

4. A storage-battery electrode having a support of non-conducting material and an integral body of finely-divided active material on said support constituting the sole conducting connection between opposite sides of the electrode, the opposite sides of said active material consisting of oxidized and oxidizable material, substantially as described.

5. A storage-battery electrode having a frame of elastic non-conducting material and finely-divided active material supported in said frame and constituting the sole conducting connection between opposite sides of the electrode, the opposite sides of said active material consisting of oxidized and oxidizable material, substantially as described.

6. A storage-battery electrode having a frame of elastic non-conducting material and an integral body of finely-divided active material supported in said frame and constituting the sole conducting connection between opposite sides of the electrode, the opposite sides of said active material consisting of oxidized and oxidizable material, substantially as described.

7. A storage-battery electrode having an integral mass of active material consisting of lead peroxid and electrolytically-reduced lead on opposite sides, said lead peroxid and electrolytically-reduced lead constituting the sole conducting connection between the opposite sides of the electrode, substantially as described.

8. A storage-battery plate having a support of non-conducting material and a homogeneous integral body of finely-divided material adapted to become active and constituting the sole conductor of the plate, substantially as described.

9. A storage-battery plate having a frame of non-conducting material and finely-divided material adapted to become active supported in said frame and constituting the sole conductor of the plate, substantially as described.

10. A storage-battery plate having a frame of elastic non-conducting material and finely-divided material adapted to become active supported in said frame and constituting the sole conductor of the plate, substantially as described.

11. A storage-battery plate having a frame of non-conducting material and a homogeneous integral body of finely-divided material adapted to become active supported in said frame and constituting the sole conductor of the plate, substantially as described.

12. A storage-battery plate having a frame of elastic non-conducting material and a homogeneous integral body of finely-divided material adapted to become active supported in said frame and constituting the sole conductor of the plate, substantially as described.

13. A storage-battery plate having a support of non-conducting material and a homogeneous integral body of lead oxid on said support constituting the sole conductor of the plate, substantially as described.

14. The method of preparing a bipolar storage-battery electrode which consists in passing a forming or charging current from one face to the other through a body of finely-divided material adapted to become active and a suitable electrolyte on the opposite faces of said body with said finely-divided material constituting the sole conducting connection between the opposite sides of the electrode, substantially as described.

15. The method of preparing a bipolar storage-battery electrode, which consists in passing a forming or charging current from one face to the other through a homogeneous integral body of finely-divided material adapted to become active and a suitable electrolyte on the opposite faces of said body with said finely-divided material constituting the sole conducting connection between the opposite sides of the electrode, substantially as described.

16. The method of preparing a bipolar storage-battery electrode which consists in filling a supporting-frame of non-conducting material with finely-divided material adapted to become active and passing a forming or charging current from one face to the other through said finely-divided material and a suitable electrolyte on the opposite faces of said material with said finely-divided material constituting the sole conducting connection between the opposite sides of the electrode, substantially as described.

17. The method of preparing a bipolar storage-battery electrode which consists in filling a supporting-frame of elastic non-conducting material with finely-divided material adapted to become active and passing a forming or charging current from one face to the other through said finely-divided material and a suitable electrolyte on the opposite faces of said material with said finely-divided material constituting the sole conducting connection between the opposite sides of the electrode, substantially as described.

18. The method of preparing a bipolar storage-battery electrode which consists in filling a supporting-frame of non-conducting material with a homogeneous integral mass of finely-divided material adapted to become active and passing a forming or charging current from one face to the other through said mass of finely-divided material and a suitable electrolyte on the opposite faces of said material with said finely-divided material constituting the sole conducting connection between the opposite sides of the electrode, substantially as described.

19. The method of preparing a bipolar storage-battery electrode which consists in peroxidizing one side of an integral body of lead oxid and reducing the other side of said body by passing an electrical current from one face to the other through said body and a suitable electrolyte on the opposite faces of said body with the lead oxid constituting the sole conducting connection between the opposite sides of the electrode, substantially as described.

20. A storage battery having end electrodes of different polarity and one or more bipolar intermediate electrodes, each of said bipolar intermediate electrodes having finely-divided active material or finely-divided material adapted to become active constituting the sole conducting connection between the opposite sides of the electrode, substantially as described.

21. A storage battery having end electrodes of different polarity and one or more bipolar intermediate electrodes, each of said bipolar intermediate electrodes having an integral mass of finely-divided active material or finely-divided material adapted to become active constituting the sole conducting connection between the opposite sides of the electrode, substantially as described.

22. A storage battery having end electrodes of different polarity and one or more bipolar intermediate electrodes, each of said bipolar intermediate electrodes having a support of non-conducting material and finely-divided active material or finely-divided material adapted to become active supported thereon and constituting the sole conducting connection between the opposite sides of the electrode, substantially as described.

23. A storage battery having end electrodes of different polarity and one or more bipolar intermediate electrodes, each of said bipolar intermediate electrodes having a supporting-frame of non-conducting material and an integral mass of finely-divided active material or finely-divided material adapted to become active supported in said frame and constituting the sole conducting connection between the opposite sides of the electrode, substantially as described.

24. A storage battery having end electrodes of different polarity and one or more bipolar intermediate electrodes, each of said bipolar intermediate electrodes having a supporting-frame of elastic non-conducting material and finely-divided active material or finely-divided material adapted to become active supported in said frame and constituting the sole conducting connection between the opposite sides of the electrode, substantially as described.

25. A storage battery having end electrodes of different polarity and one or more bipolar intermediate electrodes, each of said bipolar electrodes having finely-divided active material or finely-divided material adapted to become active constituting the sole conducting connection between opposite sides of the electrode, and an electrolyte contained or held in a mass of absorbent material in the spaces between the electrodes, substantially as described.

26. A storage battery having end electrodes of different polarity, and one or more bipolar intermediate electrodes, each of said bipolar intermediate electrodes having an integral mass of, before forming or charging, lead oxid constituting the sole conducting connection between the opposite sides of the electrode, substantially as described.

27. A storage battery having end electrodes of different polarity and one or more bipolar intermediate electrodes, each of said bipolar intermediate electrodes consisting of a frame of non-conducting material filled with an integral mass of, before forming or charging, lead oxid, said lead oxid constituting the sole conducting connection between the opposite sides of the electrode, substantially as described.

28. A storage battery consisting of a containing vessel, end electrodes of different polarity, one or more bipolar intermediate electrodes, each of said bipolar intermediate electrodes consisting of an integral mass of, before forming or charging, lead oxid supported in a frame of non-conducting material, said lead oxid constituting the sole conducting connection between the opposite sides of the electrode, and an electrolyte contained or held in a mass of absorbent material in the spaces between the electrodes, substantially as described.

29. As an element of a plate or electrode in a storage battery, a hexagonal frame of elastic non-conducting material containing active material or material adapted to become active, substantially as described.

30. A storage-battery plate or electrode support constructed of hexagonal frames of elastic non-conducting material, said frames being surrounded and held together by non-conducting material, substantially as described.

31. A storage-battery plate or electrode constructed of hexagonal frames of elastic non-conducting material each containing active material or material adapted to become active, said frames being surrounded and held together by molded non-conducting material, such as an asphalt compound, substantially as described.

32. A storage battery having end electrodes with conducting-lugs and intermediate electrodes constructed of hexagonal frames of elastic non-conducting material each containing active material or material adapted to become active, said frames being surrounded and held together by non-conducting material, substantially as described.

In testimony whereof I have hereunto set my hand in the presence of two subscribing witnesses.

LEONARD PAGET.

Witnesses:
C. J. SAWYER,
A. L. KENT.